(12) United States Patent
Smith

(10) Patent No.: US 7,898,389 B2
(45) Date of Patent: *Mar. 1, 2011

(54) RADIO FREQUENCY IDENTIFICATION (RFID) TAGS AND METHODS OF COMMUNICATING BETWEEN A RADIO FREQUENCY IDENTIFICATION (RFID) TAG AND AN INTERROGATOR

(75) Inventor: Freddie W. Smith, Boise, ID (US)

(73) Assignee: Round Rock Research, LLC, Mt. Kisco, NY (US)

(*) Notice: Subject to any disclaimer, the term of this patent is extended or adjusted under 35 U.S.C. 154(b) by 1215 days.

This patent is subject to a terminal disclaimer.

(21) Appl. No.: 11/483,198

(22) Filed: Jul. 7, 2006

(65) Prior Publication Data

US 2007/0018904 A1 Jan. 25, 2007

Related U.S. Application Data

(63) Continuation of application No. 10/075,791, filed on Feb. 12, 2002, now Pat. No. 7,075,901, which is a continuation of application No. 09/020,595, filed on Feb. 4, 1998, now Pat. No. 6,356,535.

(51) Int. Cl.
*H04Q 5/22* (2006.01)
(52) U.S. Cl. ............... 340/10.1; 340/572.7; 340/572.1; 370/278
(58) Field of Classification Search ................ 370/287, 370/278; 340/10.1, 10.34, 572.1, 572.7, 340/933, 572.5; 342/42–51; 343/726, 730, 343/755, 815, 834, 844, 701, 700 MS, 777; 455/78, 80, 81, 101, 106, 107, 129, 272, 455/279.1, 282, 277.1
See application file for complete search history.

(56) References Cited

U.S. PATENT DOCUMENTS 3,569,976 A 3/1971 Korvin et al.

(Continued)

OTHER PUBLICATIONS

Peng, Chen et al., "The Analysis and Design of a Novel Passive Reflection Modulation Tag," IEEE Proceedings of the 4th International Conference on Microwave and Millimeter Wave Technology, pp. 402-405, Aug. 2004.

(Continued)

*Primary Examiner* — Edwin C Holloway, III
(74) *Attorney, Agent, or Firm* — Lerner, David, Littenberg, Krumholz & Mentlik, LLP

(57) ABSTRACT

The present invention provides communication devices, communication systems and methods of communicating. According to one embodiment of the invention, a communication device includes: a first antenna operable to receive wireless communication signals; a second antenna having plural leads, the second antenna being operable to output wireless communication signals; a connection including plural conductive lines having respective first ends and second ends, the connection being coupled with the leads of the second antenna at the first ends of the lines; and a switch coupled with the second ends of the connection, the switch being operable to provide one of selective shorting and isolation of the leads. One method of communicating of the invention includes: forming a first antenna; forming a second antenna; receiving wireless interrogation signals using the first antenna; outputting wireless identification signals using the second antenna; opening a coupling intermediate plural leads of the second antenna during the receiving; selectively shorting the leads of the second antenna during the outputting; and providing a low load impedance of the second antenna during the receiving.

20 Claims, 8 Drawing Sheets

U.S. PATENT DOCUMENTS

| | | | |
|---|---|---|---|
| 3,733,608 A | 5/1973 | McGhay et al. |
| 3,745,569 A | 7/1973 | Works et al. |
| 4,075,632 A | 2/1978 | Baldwin et al. |
| 4,173,019 A | 10/1979 | Williams |
| 4,623,874 A | 11/1986 | Thoma |
| 4,630,044 A | 12/1986 | Polzer |
| 4,692,769 A | 9/1987 | Gegan |
| 4,926,182 A | 5/1990 | Ohta et al. |
| 4,963,887 A | 10/1990 | Kawashima et al. |
| 5,023,866 A | 6/1991 | De Muro |
| 5,053,774 A | 10/1991 | Shcuermann et al. |
| 5,081,458 A | 1/1992 | Meunier |
| 5,084,699 A | 1/1992 | DeMichele |
| 5,119,099 A | 6/1992 | Haruyama et al. |
| 5,164,985 A | 11/1992 | Nysen et al. |
| 5,182,570 A | 1/1993 | Nysen et al. |
| 5,320,561 A | 6/1994 | Cook et al. |
| 5,374,930 A | 12/1994 | Shcuermann |
| 5,446,447 A | 8/1995 | Carney et al. |
| 5,448,110 A * | 9/1995 | Tuttle et al. ............ 257/723 |
| 5,450,086 A | 9/1995 | Kaiser |
| 5,465,099 A * | 11/1995 | Mitsui et al. ............ 343/730 |
| 5,467,099 A | 11/1995 | Bonebright et al. |
| 5,491,484 A | 2/1996 | Schuermann |
| 5,491,715 A | 2/1996 | Flaxl |
| 5,512,910 A | 4/1996 | Murakami et al. |
| 5,528,222 A | 6/1996 | Moskowitz et al. |
| 5,537,105 A | 7/1996 | Marsh et al. |
| 5,561,435 A | 10/1996 | Naibandian et al. |
| 5,572,226 A * | 11/1996 | Tuttle ...................... 343/726 |
| 5,598,169 A | 1/1997 | Drabeck et al. |
| 5,606,323 A | 2/1997 | Heinrich et al. |
| 5,617,060 A | 4/1997 | Wilson et al. |
| 5,621,412 A | 4/1997 | Sharpe et al. |
| 5,649,295 A | 7/1997 | Shober et al. |
| 5,649,296 A | 7/1997 | MacLellan et al. |
| 5,682,143 A | 10/1997 | Brady et al. |
| 5,726,630 A | 3/1998 | Marsh et al. |
| 5,771,021 A | 6/1998 | Veghte et al. |
| 5,838,235 A | 11/1998 | Thorigne |
| 5,842,118 A | 11/1998 | Wood, Jr. |
| 5,889,478 A | 3/1999 | Minesi |
| 5,900,808 A | 5/1999 | Lebo |
| 5,923,298 A | 7/1999 | Miyahara et al. |
| 5,942,977 A | 8/1999 | Palmer et al. |
| 5,959,357 A | 9/1999 | Korman |
| 6,028,564 A | 2/2000 | Duan et al. |
| 6,037,907 A | 3/2000 | Ha et al. |
| 6,122,494 A | 9/2000 | Tuttle |
| 6,130,602 A | 10/2000 | O'Toole et al. |
| 6,177,872 B1 | 1/2001 | Kodukula et al. |
| 6,184,841 B1 | 2/2001 | Shober et al. |
| 6,192,222 B1 | 2/2001 | Greeff et al. |
| 6,239,765 B1 | 5/2001 | Johnson et al. |
| 6,243,012 B1 | 6/2001 | Shober |
| 6,317,027 B1 | 11/2001 | Watkins |
| 6,329,139 B1 | 12/2001 | Nova et al. |
| 6,329,915 B1 | 12/2001 | Brady |
| 6,356,535 B1 | 3/2002 | Smith |
| 6,362,737 B1 | 3/2002 | Rodgers et al. |
| 6,411,212 B1 | 6/2002 | Hecht et al. |
| 6,574,454 B1 | 6/2003 | Tuttle |
| 6,611,691 B1 | 8/2003 | Zhou et al. |
| 6,717,923 B1 | 4/2004 | Smith |
| 6,738,025 B2 | 5/2004 | Carrender |
| 6,825,773 B1 | 11/2004 | O'Toole et al. |
| 6,885,353 B2 | 4/2005 | Kurihara |
| 7,006,048 B2 | 2/2006 | Change |
| 7,026,935 B2 | 4/2006 | Diorio et al. |
| 7,075,901 B2 | 7/2006 | Smith |
| 7,091,860 B2 | 8/2006 | Martinez de Velasco Cortina et al. |
| 7,132,946 B2 | 11/2006 | Waldner et al. |
| 7,327,257 B2 | 2/2008 | Posamentier |
| 2004/0178912 A1 | 9/2004 | Smith |
| 2006/0202827 A1 | 9/2006 | Volpi et al. |
| 2007/0290807 A1 | 12/2007 | Smith |
| 2009/0015407 A1 | 1/2009 | Tuttle |
| 2009/0027168 A1 | 1/2009 | Tuttle |
| 2009/0278688 A1 | 11/2009 | Tuttle |
| 2009/0289771 A1 | 11/2009 | Tuttle |

OTHER PUBLICATIONS

Turner, Chris, "Backscatter Modulation of Impedance Modulated RFID Tage," located at www.rfip.eu/backscatter_tag_link_budget_and_modulation_at_reader_receiver.pdf, Feb. 2003.

U.S. Appl. No. 08/806,158; "A System for Locating an Individual in a Facility"; Tuttle; Filed Feb. 25, 1997 now abandoned.

Chartered Semiconductor Manufacturing, "Toppan Announces Volume Production of Next-Generation RFID Chip," press release, Jul. 8, 2003.

Sakamura, Ken, "TRON News Items for Jan. 2004," located at http://tronweb.super-nova.co.jp/tronnews04-1.html, Jan. 2004.

Tuttle, John R., U.S. Appl. No. 08/806,158, filed Feb. 25, 1997, now abandoned.

* cited by examiner

RADIO FREQUENCY IDENTIFICATION (RFID) TAGS AND METHODS OF COMMUNICATING BETWEEN A RADIO FREQUENCY IDENTIFICATION (RFID) TAG AND AN INTERROGATOR

RELATED PATENT DATA

This patent resulted from a continuation of and claims priority to U.S. patent application Ser. No. 10/075,791, filed on Feb. 12, 2002, entitled "Communication Systems, Communication Apparatuses, Radio Frequency Communication Methods, Methods of Communicating Using a Radio Frequency Communication System, and Methods of Forming a Radio Frequency Communication Device", naming Freddie W. Smith as inventor, now U.S. Pat. No. 7,075,901 which is a continuation of U.S. patent application Ser. No. 09/020,595, filed on Feb. 4, 1998, entitled "Communication Systems, Communication Apparatuses, Radio Frequency Communication Methods, Methods of Communicating Using a Radio Frequency Communication System, and Methods of Forming a Radio Frequency Communication Device", naming Freddie W. Smith as inventor, now U.S. Pat. No. 6,356,535 which issued on Mar. 12, 2002, the disclosure of which is incorporated herein by reference.

TECHNICAL FIELD

The present invention relates to communication devices, communication systems and methods of communicating, and more particularly to radio frequency communication devices.

BACKGROUND OF THE INVENTION

Electronic identification systems typically comprise two devices which are configured to communicate with one another. Preferred configurations of the electronic identification systems are operable to provide such communications via a wireless medium.

One such configuration is described in U.S. patent application Ser. No. 08/705,043, filed Aug. 29, 1996, assigned to the assignee of the present application and incorporated herein by reference. This application discloses the use of a radio frequency (RF) communication system including communication devices. The disclosed communication devices include an interrogator and a transponder, such as a tag or card.

Such communication systems can be used in various identification functions and other applications. The interrogator is configured to output a polling signal which may comprise a radio frequency signal including a predefined code. The transponders of such a communication system are operable to transmit an identification signal responsive to receiving an appropriate command or polling signal. More specifically, the appropriate transponders are configured to recognize the predefined code. The transponders receiving the code subsequently output a particular identification signal which is associated with the transmitting transponder. Following transmission of the polling signal, the interrogator is configured to receive the identification signals enabling detection of the presence of corresponding transponders.

Such communication systems are useable in identification applications such as inventory or other object monitoring. For example, a remote identification device is attached to an object of interest. Responsive to receiving the appropriate polling signal, the identification device is equipped to output an identification signal. Generating the identification signal identifies the presence or location of the identification device and the article or object attached thereto.

It is preferred to maximize communication range between communication devices of the identification system while providing robust communications. Increasing the range also increases the applications of the identification system. Providing robust communications ensures reliability and integrity of the system.

However, limitations exist upon the wireless communication components utilized within the communication devices. For example, given the nature of use of such electronic devices (i.e., attachment of the transponder to other devices or objects), it is preferred to minimize the size of the electronic device. Compact electronic devices also have cosmetic and utilitarian advantages over larger conventional communication devices. Size limitations impose limitations upon the wireless communication components themselves. In addition, the Federal Communication Commission also imposes power limits upon the wireless communication components.

Therefore, it is desirable to provide an identification device which achieves the benefits of increased range and robust wireless communications in consideration of size and power limitations.

SUMMARY OF THE INVENTION

According to one aspect, the present invention provides a communication device including a first antenna operable to receive wireless communication signals and a second antenna having plural leads and operable to output wireless communication signals. The communication device further comprises a connection coupled with the second antenna and a switch. The switch is operable to provide selective shorting, and insulation or electrical isolation of leads of the second antenna. The connection provides low load impedance of the second antenna during receiving of wireless communication signals in a preferred embodiment of the invention.

According to some embodiments of the invention, the communication devices comprise one of a radio frequency identification device and a remote intelligent communication device.

Another communication device of the present invention includes a first antenna operable to receive wireless communication signals and a second antenna operable to output wireless communication signals. The second antenna is selectively configured between high load impedance and low load impedance. The communication device includes a switch selectively operable to electrically short and insulate the leads. Further, a transformer is provided intermediate the switch and the a second antenna and the transformer is configured to provide low load impedance of the second antenna responsive to the switch being open.

The present invention also provides a communication system including an interrogator and a communication device configured to communicate with the interrogator. The communication device includes a first antenna operable to receive wireless signals from the interrogator and a second antenna operable to output wireless signals to the interrogator. The communication device also includes a connection configured to provide a low load impedance of the second antenna during receiving of wireless signals using the first antenna.

One method of communicating according to the present invention includes forming a first antenna, forming a second antenna, receiving wireless interrogation signals using the first antenna and outputting wireless identification signals using the second antenna. The method also provides opening a coupling intermediate plural leads of the second antenna during the receiving, selectively shorting the leads of the second antenna during the outputting, and providing a low load impedance of the second antenna during the receiving. Methods according to additional aspects of the invention also provide beam forming using the first and second antennas.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The present invention provides electronic devices configured to communicate via wireless communication signals, such as radio frequency signals. The present invention additionally provides methods of communicating.

Some embodiments of the electronic devices include electronic communication devices such as wireless identification devices. Exemplary electronic communication devices include radio frequency identification is devices (RFID) and remote intelligent communication devices (RIC). A remote intelligent communication device is capable of functions other than the identifying function of a radio frequency identification device. A preferred remote intelligent communication device includes a processor.

Some communication devices disclosed herein are implemented upon printed circuit boards (PCBs) according to described aspects of the present invention. The disclosed embodiments are illustrative and other configurations including encapsulated devices which utilize features of the present invention are possible.

Figure 1:
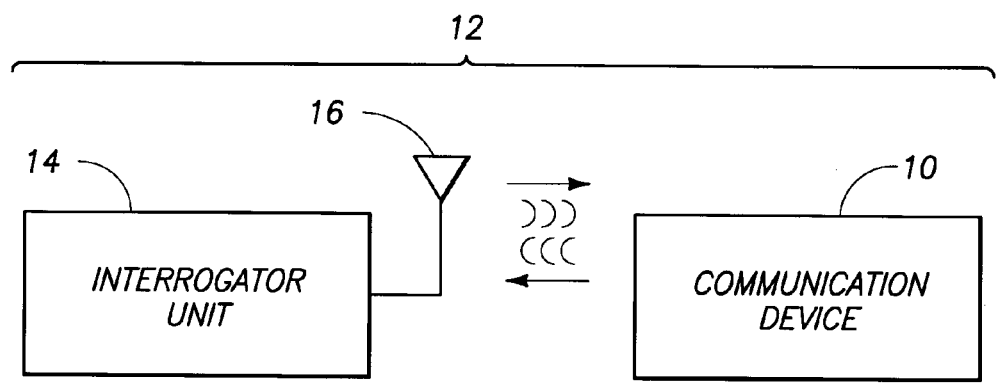
FIG. 1 is a functional block diagram illustrating a wireless communication system.

Referring to FIG. 1, a communication system is illustrated. Although the communication system is described with reference to a wireless identification system 12, the present invention is implemented in other configurations in accordance with other embodiments. The depicted identification system 12 includes a remote communication device 10, such as a remote intelligent communication device or a radio frequency identification device, and an interrogator unit 14. Typically, plural communication devices 10 are provided to communicate with interrogator unit 14. An exemplary wireless identification system 12 is described in U.S. patent application Ser. No. 08/705,043, incorporated by reference above. An exemplary interrogator 14 is described in detail in U.S. patent application Ser. No. 08/806,158, filed Feb. 25, 1997, assigned to the assignee of the present application and incorporated herein by reference.

Communication device 10 is configured to communicate via electromagnetic signals with interrogator unit 14. Preferably, device 10 communicates with interrogator unit 14 via wireless electromagnetic signals, such as radio frequency (RF) signals. Wireless electromagnetic signals or radio frequency signals, such as microwave signals, are utilized for communications in the preferred embodiment of identification system 12. Interrogator unit 14 further includes an antenna 16 to facilitate wireless communications.

In one embodiment of the identification system 12, interrogator 14 outputs an interrogation signal via antenna 16 during forward link communications. The interrogation signal is received and processed by any communication devices 10 within the transmission range of interrogator 14. Following processing, appropriate communication devices 10 are configured to return an identification signal during return link communications. The identification signal identifies the individual device 10 transmitting the identification signal in one embodiment of the invention.

Figure 2:
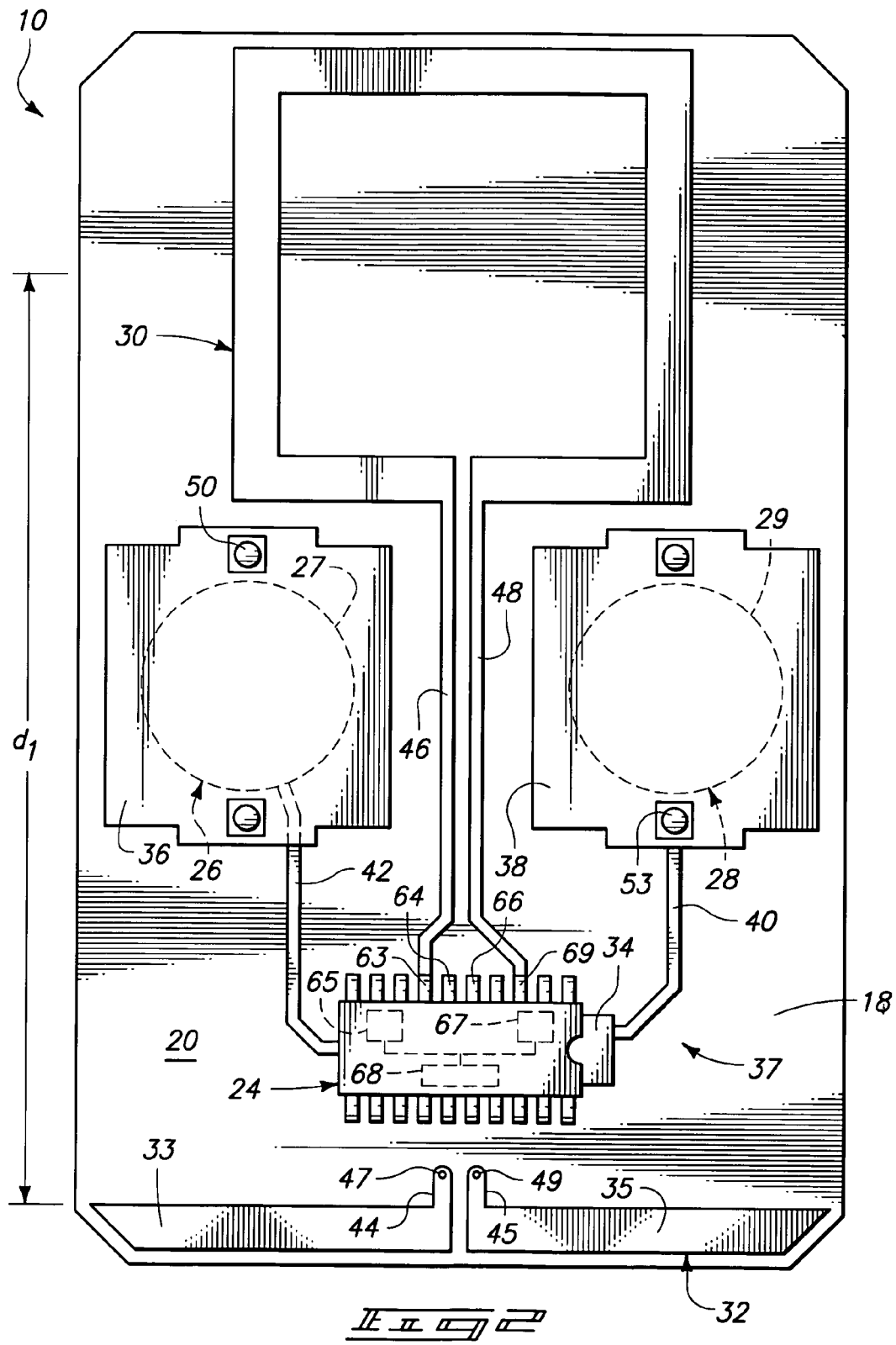
FIG. 2 is a top plan view of one embodiment of a communication device of the communication system of FIG. 1.

Referring to FIG. 2, one embodiment of communication device 10 is shown. Communication device 10 includes a base substrate 18 which comprises a printed circuit board in the described embodiment. Other substrates, such as a flexible polyester film, are utilized in other embodiments. Substrate 18 includes a first surface 20 shown in FIG. 2. Substrate 18 also includes a second surface 22 (shown in FIG. 4) opposite first surface 20.

Communication device 10 includes plural components mounted upon first surface 20. Such components include an integrated circuit 24, and first and second power supplies 26, 28 in one embodiment. Other power supply configurations may be utilized. A conductive trace or pattern 37 is provided upon first surface 20 to provide electrical interconnection of the components. Conductive pattern 37 includes conductors 40, 42, 46, 48 to provide electrical interconnection.

Further, the illustrated conductive pattern 37 includes a first antenna 30 and second antenna 32 for implementing wireless communications. First antenna 30 is also referred to as a receive or forward link antenna and second antenna 32 is also referred to as a transmit or return link antenna. Conductive pattern 37 comprises copper in one embodiment of the invention. Other materials are utilized in other embodiments to form conductive pattern 37.

One embodiment of integrated circuit 24 includes suitable communication circuitry within communication device 10 for providing wireless communications. For example, in one embodiment, integrated circuit 24 includes a microprocessor 65, memory 67, and transponder circuitry 68 in cooperation with one another for providing wireless communications with interrogator unit 14. An exemplary and preferred integrated circuit 24 is described in U.S. patent application Ser. No. 08/705,043 incorporated by: reference above. The illustrated integrated circuit 24 is packaged in a conventional small outline (SOIC) package.

One embodiment of the communication circuitry or transponder circuitry 68 includes a modulator, such as a transmitter, and a receiver operable to respectively communicate (i.e., output) and receive wireless electronic signals. The microprocessor 65 is coupled with transponder circuitry 68 and is configured to process the electronic signals. Responsive to the detection of an appropriate interrogation or polling signal, microprocessor 65 instructs transponder circuitry 68 to output the identification signal. The modulator comprises an active transmitter or a backscatter device according to certain embodiments. Such outputting or communicating of the communication signals via the modulator comprises one of transmitting electromagnetic signals and reflecting received signals.

Plural power supplies 26, 28 are provided in the described embodiment of communication device 10. A single power supply is utilized in other embodiments. The illustrated power supplies 26, 28 are connected in series to provide operational power to components of communication device 10. Power supplies 26, 28 provide power at approximately 6 volts to components of communication device 10. The illustrated power supplies 26, 28 comprise batteries although other power sources may be utilized.

Brackets 36, 38 are elevated from first surface 20 and are configured to hold respective power supplies 26, 28 upon substrate 18. Perimetral edges of power supplies 26, 28 form positive or power terminals. Upper surfaces (i.e., facing away from surface 20) of power supplies 26, 28 also form the positive terminals. Brackets 36, 38 provide electrical coupling with the positive terminals at edges 27, 29 and the upper surfaces of power supplies 26, 28. Brackets 36, 38 are formed of stainless steel in the described embodiment of the invention. Alternatively, other conductive materials may be utilized to fabricate brackets 36, 38.

The device 10 includes plural vias which extend through respective brackets 36, 38 and substrate 18. A first via receives a conductive post 53. Post 53 provides electrical coupling of the elevated bracket 38 to first surface 20 of substrate 18. Post 53 is electrically coupled with conductor 40. Positive power from power supplies 26, 28 is applied to capacitor 34 and integrated circuit 24 via post 53 and conductor 40.

Conductor 42 provides electrical coupling of the negative terminal of power supply 26 with integrated circuit 24. Conductor 42 is coupled with a pad 54 (shown in FIG. 3) provided below power supply 26. Conductor 42 is insulated from bracket 36.

The positive terminal of power supply 26 is electrically coupled with the negative terminal of power supply 28. A via is provided through bracket 36 and substrate 18. A conductive post 50 is provided within the via and electrically couples bracket 36 with the second surface 22 of substrate 18. Referring to FIG. 4, a conductor 58 is upon second surface 22 is coupled with post 50. Another conductive post 55 provides electrical coupling of conductor 58 at second surface 22 with an electrical pad 56 upon first surface 18 (shown in FIG. 3). Post 55 is provided within a via formed through substrate 18 and is coupled with pad 56 and the negative terminal of power source 28.

Referring again to FIG. 2, first antenna 30 and second antenna 32 are formed upon first surface 20 of substrate 18. First antenna 30 is also referred to as a forward link or receive antenna operable to receive wireless communication signals. First antenna 30 comprises a loop antenna in the illustrated embodiment. Other antenna configurations are possible for first antenna 30.

Conductors 46, 48 operate to couple first antenna 30 with plural IC connections 63, 69 of integrated circuit 24. IC connections 63, 69 provide an RX input to transponder 68. The RX input has an impedance of about 50 Ohms (real) and is invariant in the described embodiment. Thus, receive antenna 30 sees a constant load of about 50 Ohms. Receive antenna 30 and RX input are "matched" in a preferred embodiment to provide maximum RF voltage to the RX input.

Second antenna 32 is formed as a dipole antenna including portions or halves 33, 35 upon first surface 20 of substrate 18. Second antenna 32 may be also referred to as a return link antenna or transmit antenna and is operable to output wireless signals. Halves 33, 35 of antenna 32 have corresponding lengths appropriate for the desired transmission frequency. In the illustrated embodiment, halves 33, 35 of the dipole antenna 32 have respective sizes appropriate for 2.45 GHz communications. Second antenna 32 is formed in other configurations in other embodiments.

Second antenna 32 includes plural leads 44, 45 for connection to integrated circuit 24. In one embodiment, a connection 60 (shown in FIG. 4) is utilized to couple leads 44, 45 of second antenna 32 with plural IC connections 64, 66 of integrated circuit 24 as described in detail below. Connection 60 is also referred to herein as a coupler or transformer.

Conductors 46, 48 of trace 37 are formed upon first surface 20 of substrate 18 to connect leads 44, 45 of first antenna 30 with integrated circuit 24. In one embodiment of the invention, conductors 46, 48 individually have a predefined length to separate first antenna 30 and second antenna 32 by a distance $d_1$. In one embodiment of the invention, distance $d_1$ is approximately equal to the wavelength of the wireless communication signals. Communication device 10 and interrogator unit 14 of system 12 are operable to communicate via wireless signals having a frequency of 2.45 GHz in the described embodiment. The lengths of conductors 46, 48 may be adjusted for utilization of other communication frequencies.

Separating first antenna 30 and second antenna 32 by a distance approximately equal to the wavelength of the wireless communication signals beam forms receive antenna 30 to a desired direction. Such interacting and beam forming (phase tuning) of antennas 30, 32 enhances the gain of both antennas 30, 32. The amount of interaction between antennas 30, 32 depends upon the spacing of the is antennas 30, 32 (i.e., distance $d_1$) and the impedance load of antennas 30, 32. Adjusting spacing $d_1$ adjusts the phase tuning of antennas 30, 32.

Figure 3:
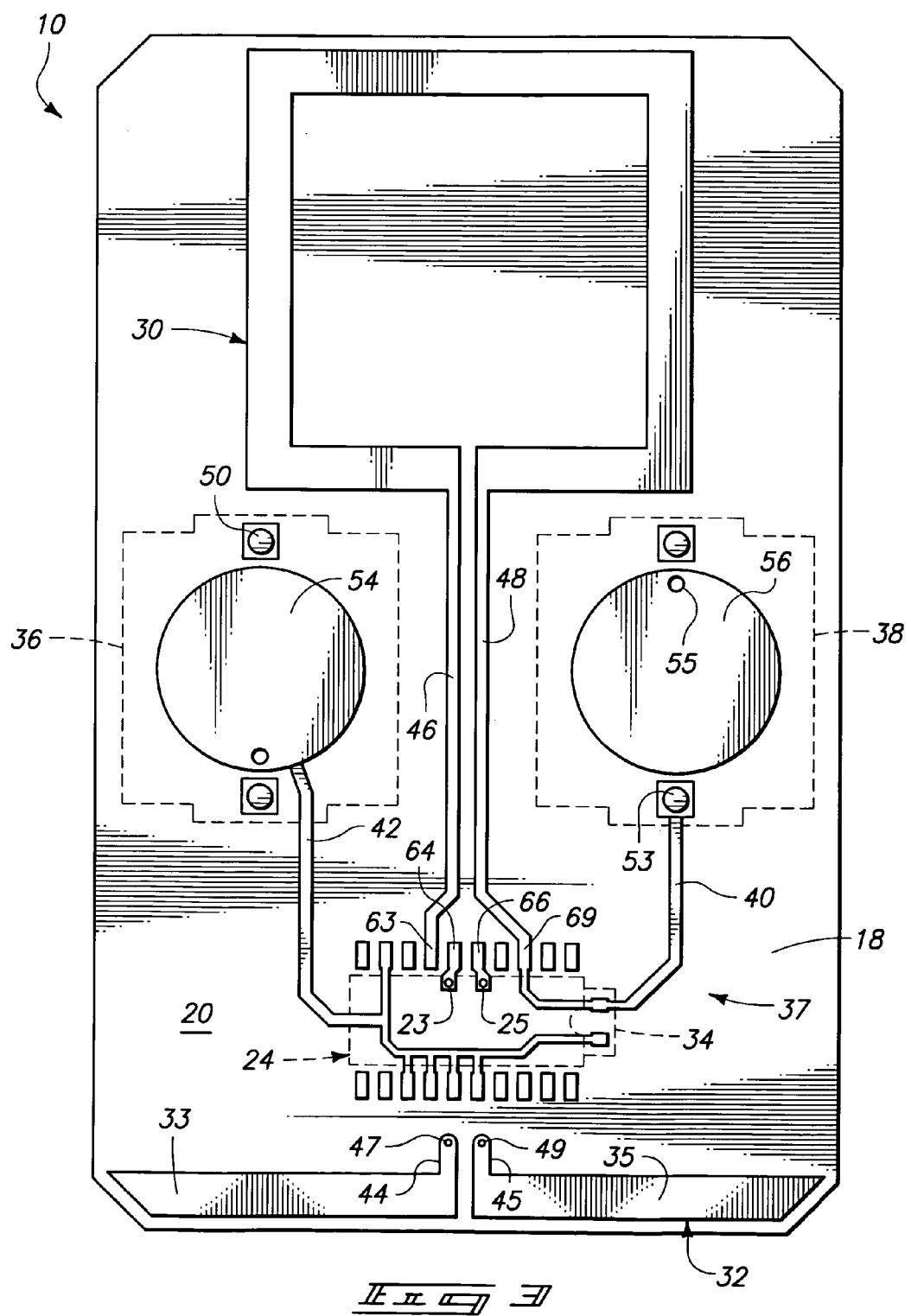
FIG. 3 is a top plan view of the communication device at an intermediate processing step.
Figure 4:
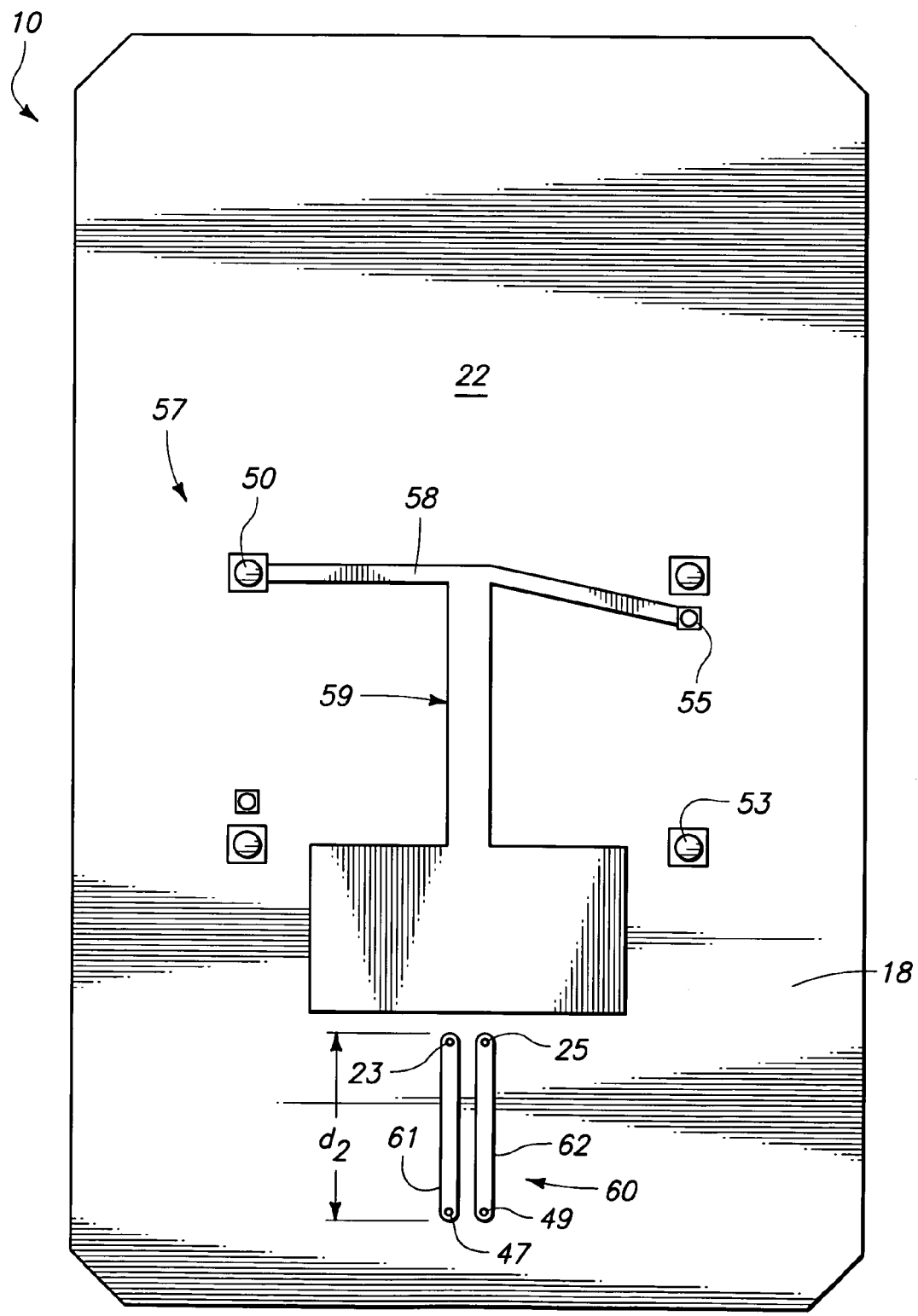
FIG. 4 is a bottom view of the communication device at an intermediate processing step.

Referring to FIG. 3, first surface 20 of substrate 18 is shown with the components removed. Positioning of brackets 36, 38 for coupling with power electrodes of power sources 26, 28 is shown in phantom. Further, positioning of integrated 24 and capacitor 34 are also shown in phantom on first surface 20. Capacitor 34 is provided in the illustrated embodiment to reduce noise in the wireless communications.

Conductive pattern 37 includes pads 54, 56 for coupling with respective power supplies 26, 28. In the described embodiment, the negative terminals of power supplies 26, 28 are electrically coupled with pads 54, 56, respectively. In particular, battery brackets 36, 38 utilize spring tension to couple power supplies 26, 28 with pads 54, 56. The negative terminals are soldered or attached to pads 54, 56 by conductive epoxy in alternative embodiments. Other attachment methods may also be utilized.

As shown in FIG. 3, plural vias are provided within leads 44, 45 of second antenna 32 and through substrate 18. Conductive posts 47, 49 are inserted through the vias and electrically coupled with respective leads 44, 45 of second antenna 32. Posts 47, 49 are provided to electrically couple first surface 20 with second surface 22 of substrate 18.

Plural vias are also provided through substrate 18 for electrical connection with IC connections 64, 66 of integrated circuit 24. Conductive posts 23, 25 are provided within vias adjacent integrated circuit 24 to provide electrical connection intermediate first surface 20 and second surface 22 of substrate 18. A connection 60 (shown in FIG. 4) is utilized adjacent second surface 22 to couple conductive posts 47, 49 with respective conductive posts 23, 25.

Referring to FIG. 4, second surface 22 of substrate 18 is shown. A second conductive trace or pattern 57 is formed upon second surface 22. Conductive trace 57 includes a conductor 58, connection plane 59 and connection 60. Second conductive trace 57 is formed of copper in one embodiment. Other conductive materials are utilized in other embodiments. Plane 59 is spaced relative to conductors 46, 48 provided upon first surface 20 of substrate 18 and is configured to float at a voltage of approximately 3.2 volts.

Conductor 58 electrically couples conductive post 50 with post 55. Conductor 58 provides electrical coupling of the positive terminal of power source 26 with the negative terminal of power source 28 through bracket 36, posts 50, 55 and pad 56.

Connection 60 comprises plural conductive lines 61, 62 in the illustrated embodiment. Lines 61, 62 include respective first ends and second ends. First ends of lines 61, 62 are coupled with leads 44, 45 of second antenna 32, respectively. Second ends of lines 61, 62 are coupled with IC connections 64, 66, respectively.

First line 61 is configured to electrically couple conductive posts 23, 47 and second line 62 is configured to electrically couple conductive posts 25, 49. Posts 47, 49 are electrically coupled with leads 44, 45 of second antenna 32. Posts 23, 25 are electrically coupled with IC connections 64, 66 (shown in FIG. 2) of integrated circuit 24.

In one embodiment of the invention, lines 61, 62 are parallel and configured as transmission lines. Lines 61, 62 have a predefined distance $d_2$ between second antenna 32 and transponder 68. The distance $d_2$ is equal to approximately one quarter the wavelength of the wireless communication signals in the described embodiment.

Provision of connection 60 as a quarter wave transmission line coupled with second antenna 32 forms a parasitic antenna element that interacts favorably with receive antenna 30 to enhance the receive antenna gain. As described in detail below, quarter wavelength connection 60 operates as a transformer to transform high load impedance for second antenna 32 to low load impedance. Providing low load impedance during receive operations within device 10 provides maximum interaction of transmit antenna 32 with receive antenna 30 (beam forming) and provides the desired enhancement.

Figure 5:
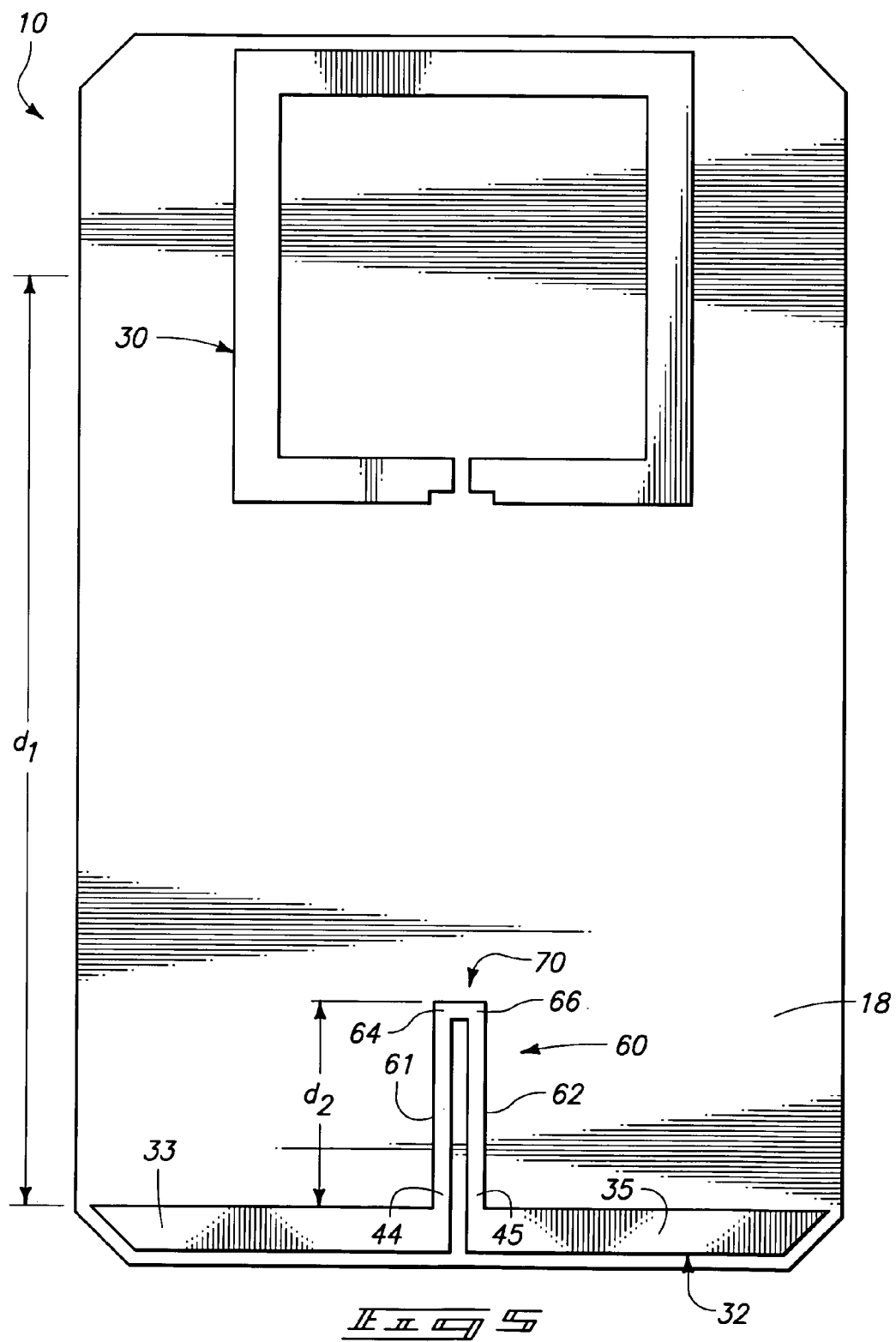
FIG. 5 is a diagrammatic representation of antennas of the communication device.

Referring to FIG. 5, the modulator of transponder 68 within integrated circuit 24 includes plural antenna ports BS1 and BS2 which are electrically coupled with connections 64, 66 of integrated circuit 24. Antenna ports BS1 and BS2 provide backscatter connections with transponder 68. Connection 60 electrically couples antenna 32 with antenna ports BS1 and BS2.

Antenna ports BS1 and BS2 (IC connections 64, 66) form an impedance gap in the described embodiment. Antenna ports BS1 and BS2 are additionally coupled with a switch 70 provided within integrated circuit 24. Switch 70 is referred to as a backscatter switch in some embodiments. Switch 70 is operable to selectively short IC connections 64, 66 or insulate (e.g., electrically isolate) IC connections 64, 66 by opening a coupling between IC connections 64, 66. Microprocessor 65 is configured to operate switch 70 in one embodiment of the invention.

Switch 70 is illustrated as closed in FIG. 5 thereby shorting IC connections 64, 66 across the impedance gap. Switch 70 is referred to as closed or "on" when IC connections 64, 66 are shorted. The load impedance of second antenna 32 is low (approximately 30 Ohms in the described embodiment) when switch 70 is on.

Figure 6:
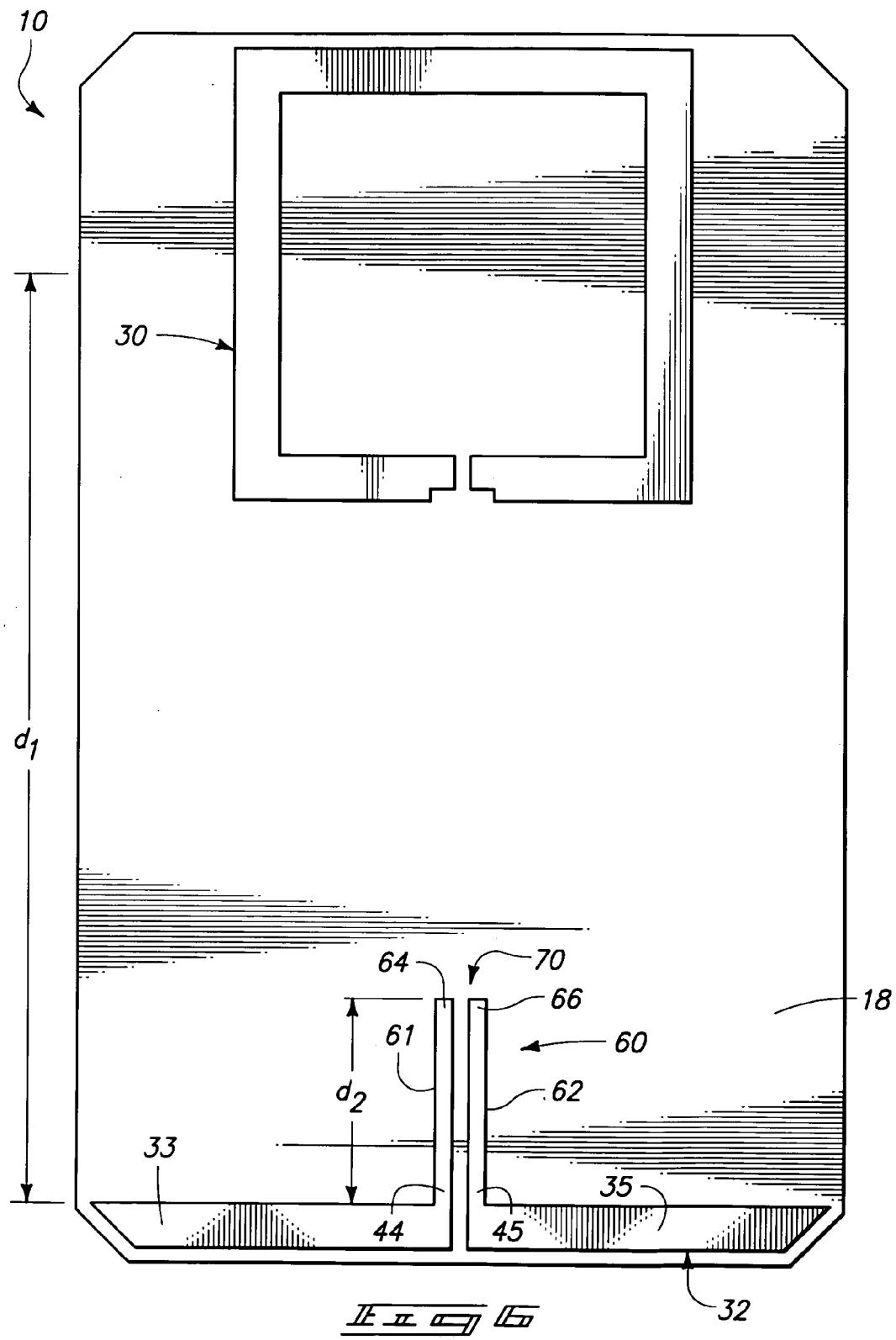
FIG. 6 is a diagrammatic representation, similar to FIG. 5, of the communication device.

Referring to FIG. 6, switch 70 is open providing a high impedance gap intermediate antenna ports BS1, BS2 (IC connections 64, 66). Switch 70 is referred to as open or "off" when IC connections 64, 66 are not electrically coupled via switch 70. The load impedance of second antenna 32 is high (approximately 150 Ohms in the described embodiment) responsive to switch 70 being off.

Figure 7:
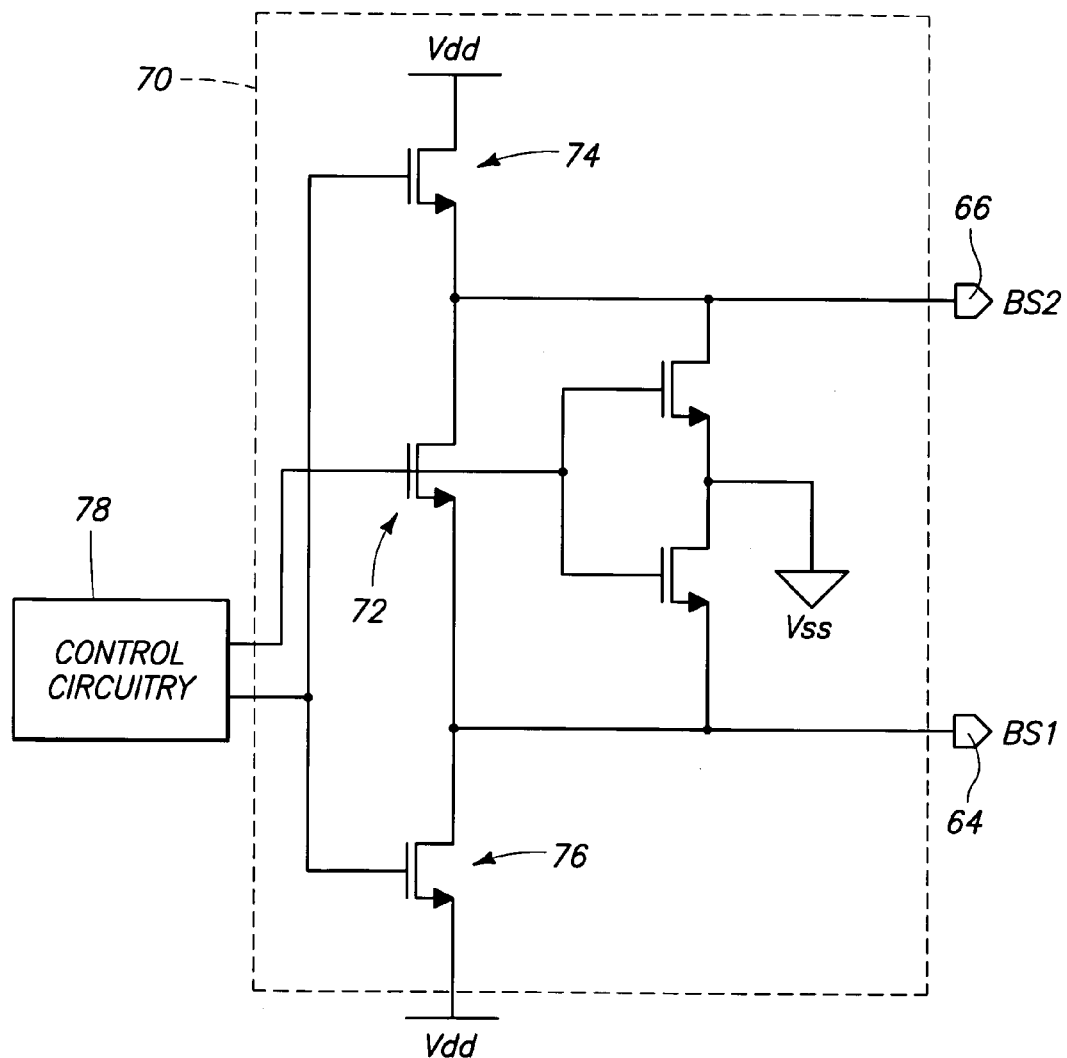
FIG. 7 is a schematic diagram of one embodiment of a backscatter switch of the communication device.

Referring to FIG. 7, one embodiment of a suitable switch 70 of integrated circuit 24 is shown. Switch 70 is coupled with IC connections 64, 66 (ports BS1, BS2). Switch 70 includes an n-channel transistor 72 and two n-channel pull-up transistors 74, 76. Transistors 74, 76 are respectively connected between a drain voltage Vdd and transistor 72.

When the gate of transistor 72 is high (switch 70 being on), then the two halves 33, 35 of antenna 32 are shorted together with a fairly low impedance via IC connections 64, 66 and connection 60. Second antenna 32 becomes substantially similar to a single half-wavelength antenna responsive to switch 70 being on or closed. In a backscatter mode of operation, when halves 33, 35 of antenna 32 are shorted together, second antenna 32 reflects a portion of the power being transmitted by interrogator 14.

When the gate of transistor 72 is low (switch 70 being off), then transistor 72 is off, and transistors 74, 76 are on. Turning transistors 74, 76 on lifts antenna ports BS1 and BS2 both up to approximately the drain voltage of Vdd. The two antenna ports BS1, BS2 and halves 33, 35 of second antenna 32 are isolated from one another by an open circuit. Second antenna 32 becomes substantially similar to two quarter wavelength antennas when switch 70 is off. In a backscatter mode of operation and the two halves 33, 35 of second antenna 32 are isolated, antenna 32 reflects very little of the power transmitted by interrogator 14.

Integrated circuit 24 includes control circuitry 78 in one embodiment for controlling switch 70 between an on state and off state. Control circuitry 78 includes cross-coupled circuitry in one embodiment of the invention. Such cross-coupled circuitry is provided to make sure that both the pull up transistors 74, 76 and the shorting device (transistor 72) are not on at the same time.

The modulated backscatter transmitter further includes another antenna port (not shown) that is intended to be used when integrated circuit 24 is packaged in the standard SOIC package. The additional antenna port provides another option for configuring a backscatter antenna. The additional antenna port is configured to supply a one milliamp current that can drive an external PIN diode that would be situated between the two halves 33, 35 of the dipole antenna 32 or any other suitable antenna. The other side of that external PIN diode can be returned to either existing antenna port BS1 or BS2.

During return link (i.e., reply mode) operations, switch 70 is turned off and on at a specified rate to form a digital return signal to interrogator 14. Turning switch 70 on and off changes the load impedance of second antenna 32. Switch 70 is off during forward link (i.e., receive mode) operations.

Maximum interaction (beam forming) of first antenna 30 and second antenna 32 occurs when second antenna 32 has a low load impedance value. However, switch 70 is off (open) during receive mode. Connection 60 operates as a transformer to transform high load impedance of second antenna 32 (responsive to switch 70 being off) into low load impedance during receive mode. Utilization of connection 60 effectively reverses the on/off states of switch 70 to off/on states. Provision of connection 60 intermediate second antenna 32 and antenna ports BS1 and BS2 provides low load impedance for second antenna 32 when switch 70 is off. Providing low load impedance yields maximum interaction of second antenna 32 with first antenna 30 in receive mode, enhancement of the receive gain of first antenna 30 and enhancement of communication range of communication device 10 in general.

In the described embodiment, first antenna 30 and second antenna 32 are beam formed in forward and backward directions normal to first surface 20 of substrate 18 (the surface containing both antennas 30, 32). The forward direction faces away from first surface 20 of substrate 18 and the backward direction faces away from second surface 22 of substrate 22. Antennas 30, 32 are arranged in other configurations (e.g., other spacings $d_1$ are utilized) to beam form antennas 30, 32 in other directions in alternative embodiments.

Figure 8:
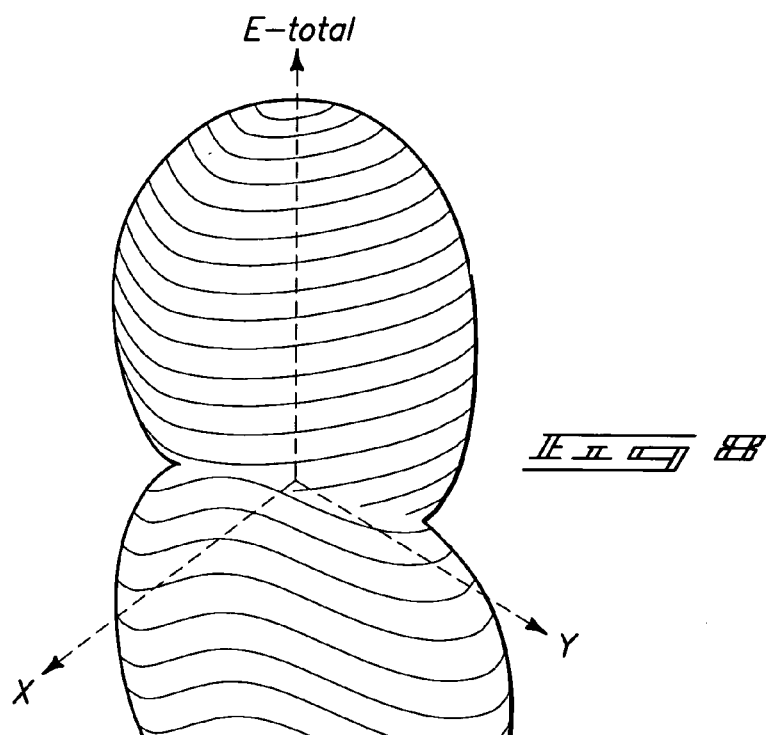
FIG. 8 is a gain plot of a receive antenna of the communication device.

Referring to FIG. 8, a gain plot for the receive or first antenna 30 is shown. This figure illustrates the normal gain of a loop receive antenna 30 by itself. The directivity equals approximately 3.2 dB.

Figure 9:
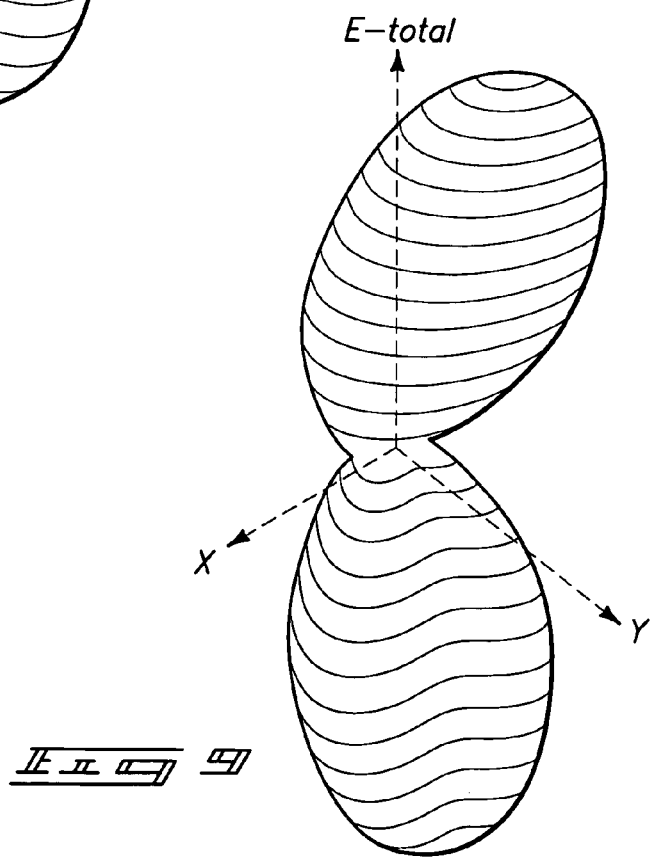
FIG. 9 is a gain plot of the receive antenna of the communication device illustrating enhanced gain.

Referring to FIG. 9, a gain plot for the receive antenna 30 beam formed with the transmit antenna 32 according to the present invention is shown and demonstrates the enhanced gain. The directivity is approximately 5.3 dB. The gain plot of FIG. 9 illustrates an enhancement of receive antenna gain by 2-3 dB. The beam of receive antenna 30 is more narrowly focused with the use of transmission line connection 60 as shown in FIG. 9, compared with the beam of the receive antenna 30 only shown in FIG. 8.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A radio frequency identification (RFID) tag, comprising:
a loop antenna formed upon a first surface of the RFID tag, the loop antenna operable to receive communications signals;
a dipole antenna formed upon the first surface of the RFID tag, the dipole antenna having a first half and a second half and operable to output communications signals, the first half of the dipole antenna having a first antenna port, and the second half of the dipole antenna having a second antenna port; wherein the loop antenna and the dipole antenna are separated on the first surface by a distance corresponding to one wavelength of the communications signals; and
a switch coupled to the first and second antenna ports and operable to electrically short or electrically isolate the first and second halves of the dipole antenna.

2. The RFID tag of claim 1, further comprising:
a transponder coupled to the first and second antenna ports, the transponder being positioned a distance from the dipole antenna corresponding to approximately one quarter wavelength of the communications signals.

3. The RFID tag of claim 2, wherein a connection between the transponder and the dipole antenna operates to provide a low impedance for the dipole antenna when the first half and the second half of the dipole antenna are isolated by the switch.

4. The RFID tag of claim 2, wherein a connection between the transponder and the dipole antenna operates to provide a high impedance for the dipole antenna when the first half and the second half of the dipole antenna are electrically shorted by the switch.

5. The RFID tag of claim 4, wherein the connection is formed on a second surface of the RFID tag.

6. The RFID tag of claim 1, wherein the dipole antenna is adapted to reflect transmissions from an external device in a backscatter mode when the first and second halves of the dipole antenna are shorted together.

7. The RFID tag of claim 6, wherein the switch alternatively shorts and isolates the first and second halves of the dipole antenna to form a digital return signal to the external device.

8. The RFID tag of claim 1, wherein a load impedance of the dipole antenna is transformed to a low impedance to maximize the interaction between the loop antenna and the dipole antenna.

9. The RFID tag of claim 1, wherein the first half and the second half of the dipole antenna are adapted for 2.45 GHz communications.

10. A radio frequency Identification (RFID) tag, comprising:
a first antenna operable to receive command communications signals;
a dipole antenna having a first section and a second section, the dipole antenna being operable to output reply communications signals, wherein the first antenna and the dipole antenna are separated by a distance corresponding to one wavelength of the reply communications signals; and
a switch coupled to the first and second dipole antenna sections and operable to electrically connect or electrically insulate the first and second sections of the dipole antenna.

11. The RFID tag of claim 10, further comprising:
communication circuitry coupled to the first and second dipole antenna sections, the communication circuitry being positioned a distance away from the dipole antenna corresponding to approximately one quarter wavelength of the reply communications signals.

12. The RFID tag of claim 11, wherein a connection between the communication circuitry and the dipole antenna operates to provide a low impedance for the dipole antenna when the first and second sections of the dipole antenna are electrically insulated by the switch.

13. The RFID tag of claim 11, wherein a connection between the communication circuitry and the dipole antenna operates to provide a high impedance for the dipole antenna when the first and second sections of the dipole antenna are electrically shorted by the switch.

14. The RFID tag of claim 10, wherein the dipole antenna is adapted to reflect transmissions from an external device in a backscatter mode when the first and second sections of the dipole antenna are electrically connected together.

15. The RFID tag of claim 14, wherein the switch alternatively connects and insulates the first and second sections of the dipole antenna to form a digital return signal to the external device.

16. The RFID tag of claim 10, wherein the first antenna is a loop antenna and wherein a load impedance of the dipole antenna is transformed to a low impedance to maximize the interaction between the loop antenna and the dipole antenna.

17. The RFID tag of claim 10, wherein the first antenna is a loop antenna.

18. A method of communicating between a radio frequency identification (RFID) tag and an interrogator comprising:
providing, on the RFID tag, a first antenna operable to receive command communications signals and a second antenna operable to output reply communications signals, the second antenna having two sections, and wherein the first antenna and the second antenna are separated on the RFID tag by a distance corresponding to one wavelength of the reply communications signals;

providing a switch coupled to the two sections of the second antenna, the switch operable to electrically connect or electrically insulate the two sections of the second antenna;

forming a reply signal by switching the two sections of the second antenna between a connected state and an insulated state; and transforming a load impedance of the second antenna to a low impedance during a receive mode of the RFID tag.

19. The method of claim 18, further comprising:

providing communication circuitry coupled to the two sections of the second antenna, the communication circuitry positioned a distance away from the second antenna corresponding to approximately one quarter wavelength of the reply communications signals.

20. The method of claim 18, wherein the transforming a load impedance further comprises:

providing a low impedance load for the second antenna when the two sections of the second antenna are electrically insulated by the switch.

* * * * *